United States Patent Office 3,355,500
Patented Nov. 28, 1967

3,355,500
4,4'-BIS(1,1,3,3-TETRAFLUORO-1,3-DICHLORO-2-HYDROXY-2-PROPYL)-DIPHENYLETHER
Basil S. Farah, Allentown, Pa., and Everett E. Gilbert, Morris Township, Morris County, and Julian A. Otto, Stockholm, N.J., assignors to Allied Chemical Corporation, New York, N.Y., a corporation of New York
No Drawing. Filed Mar. 18, 1964, Ser. No. 352,936
1 Claim. (Cl. 260—613)

This invention relates to certain derivatives of fluorinated ketones useful as active insecticidal and miticidal toxicants.

These derivatives of fluorinated ketones are:
4-(hexafluoro-2-hydroxy-2-propyl)-diphenylmethane,
4-(hexafluoro-2-hydroxy-2-propyl)-diphenylether,
4,4'-bis(hexafluoro-2-hydroxy-2-propyl)-diphenylether,
4,4'-bis(hexafluoro-2-hydroxy-2-propyl)-diphenylsulfide,
4,4'-bis(hexafluoro-2-hydroxy-2-propyl)-biphenyl,
4-(hexafluoro-2-hydroxy-2-propyl)-p-terphenyl,
4,4''-bis(hexafloro-2-hydroxy-2-propyl)-p-terphenyl,
4-(hexafluoro-2-hydroxy-2-propyl)dodecylbenzene,
4,4'-bis(1,1,3,3-tetrafluoro-1,3-dichloro-2-hydroxy-2-propyl)-diphenylether and mixtures thereof. Except for 4-(hexafluoro - 2-hydroxy - 2-propyl-diphenylether and 4,4'-bis(hexafluoro-2-hydroxy - 2-propyl)-diphenylether, the fluorinated ketone derivatives are compounds not heretofore known in the art.

The fluorinated ketone derivatives may be prepared in high yield by intimately admixing the appropriate ketones and aromatic compounds in the presence of aluminum chloride as catalyst. The ketone reactants employed are hexafluoroacetone or sym-tetrafluorodichloroacetone, and the aromatic compound reactants employed are diphenylmethane, diphenylether, diphenylsulfide, biphenyl, p-terphenyl or dodecylbenzene.

The aluminum chloride is generally employed in ratio of at least about 0.05 mol per mol of ketone reactant. Although smaller amounts of aluminum chloride may be employed, substantially lower product yields are obtained. If required, the aluminum chloride may be employed in ratio as high as about 1.1 mols per mol of ketone reactant. Depending on whether a 1:1 molar product or 2:1 molar product is desired, the ketone and aromatic compound are reacted in mol ratio of about 1 or about 2 mols of ketone per mol of aromatic compound. In certain cases, a mixture of 1:1 molar and 2:1 molar products is obtained.

When the aromatic compound is a liquid, the use of a solvent is optional since the aromatic compound itself functions as a solvent. When, however, the aromatic compound itself functions as a solvent. When, however, the aromatic compound is a solid, a solvent is required. Suitable solvents include carbon disulfide, aliphatic hydrocarbons such as heptane, hexane, etc., fluorochloro-substituted aliphatic hydrocarbons such as trifluorotrichloroethane and chlorinated aliphatic hydrocarbons such as tetrachloroethylene.

Reaction temperatures range from about −20° to 60° C. The reaction is generally carried out at these temperatures for a reaction period of about ¼ hour or higher, depending on the quantity of product being prepared.

The following examples illustrate preparation of the fluorinated ketone derivatives. In the examples, parts are by weight.

Example 1

A solution of 33.6 parts of diphenylmethane and 1 part of aluminum chloride in about 253 parts of carbon disulfide was introduced into a reaction vessel and then treated at room temperature with a stream of hexafluoroacetone such that the hexafluoroacetone refluxed gently in a dry-ice condenser placed in the neck of the reaction vessel. When about the theoretical amount of hexafluoroacetone required for a 1:1 molar product had been added, the mixture formed two layers. The organic layer was separated, washed with water and then taken up in warm aqueous 10% sodium hydroxide. The resultant sodium hydroxide layer was washed with carbon tetrachloride. Two parts of charcoal were then added, and the solution was boiled for 5 minutes, filtered and acidified. An oil was obtained which was washed with water and heated to 250° C. to drive off volatile material. It was then taken up in hexane, stirred with 100 parts of activated alumina for 1 hour, filtered and the solvent removed. The residue was heated to 150° C. to drive off residual solvent.

The product comprising 4-(hexafluoro - 2-hydroxy-2-propyl)-diphenylmethane was distilled off at 188–190° C. at 16 mm. Hg and constituted 49 parts (73% yield). The product may be represented by the following structural formula:

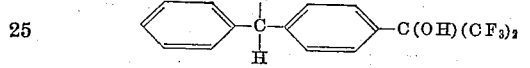

Fluorine analysis of the product was 37.0%, demonstrating that the product was predominantly 1:1 molar product.

Example 2

34 parts of diphenylether were dissolved in about 127 parts of carbon disulfide, and 1 part of aluminum chloride was added to the solution. The solution was then treated with hexafluoroacetone until no further absorption of the ketone occurred. The reaction temperature was maintained below 30° C. Absorption of hexafluoroacetone became slow after 20 parts had been added, necessitating the addition of 0.5 part of aluminum chloride to accelerate the reaction. The reaction product was worked up as in Example 1 to give 44 parts (65% yield) of product boiling at 183° C. at 15 mm. Hg.

Fluorine analysis of the product was 40.0%, showing that the product was a mixture of 4-(hexafluoro-2-hydroxy - 2-propyl)-diphenylether and 4,4'-bis(hexafluoro-2-hydroxy - 2-propyl)-diphenylether. The structural formulae for these compounds are set forth below:

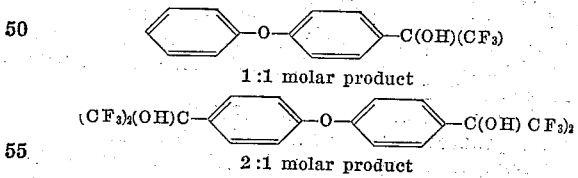

1:1 molar product

2:1 molar product

Example 3

17 parts of diphenylether and 2 parts of aluminum chloride were stirred and treated with a stream of hexafluoroacetone as rapidly as absorption occurred. The temperature of the reaction mixture rose to about 46° C. during the course of the addition and dropped to 35° C. in the latter part of the reaction. 36 parts of hexafluoroacetone were absorbed. The reaction mixture was decomposed with 100 parts of cold water, and the resultant organic layer was taken up in carbon tetrachloride, washed with water, dried and distilled. There were obtained 28 parts of 4,4'-bis(hexafluoro-2-hydroxy-2-propyl)-diphenylether boiling at 155° C. at 3 mm. Hg. Fluorine analysis of the product was 44.6% (theoretical 45.4%) and hydrogen analysis was 1.90, 1.71% (theoretical 1.99%).

Example 4

A solution of 37.2 parts of diphenylsulfide and 1 part of aluminum chloride in about 505 parts of carbon disulfide was treated with hexafluoroacetone with external cooling so that a temperature of 0–3° C. was maintained. 69 parts of hexafluoroacetone were used over a period of 2 hours. The reaction mixture was decomposed with 100 parts of water. The carbon disulfide was distilled off, and the organic residue was taken up in chloroform, washed, dried and distilled. 90 parts (87% yield) of 4,4'-bis(hexafluoro-2-hydroxy-2 - propyl) - diphenylsulfide boiling at 140–151° C. at about 1 mm. Hg were obtained. The product may be represented by the following structural formula:

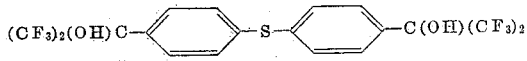

Sulfur analysis of the product gave 6.0%, as compared to a theoretical value of 6.2%.

Example 5

A solution of 32 parts of a 1:1 molar product of biphenyl and hexafluoroacetone (prepared by the general procedure of Example 1) in about 253 parts of carbon disulfide was admixed with 1 part of aluminum chloride and treated with hexafluoroacetone as rapidly as complete absorption occurred. Increments of 1 part of aluminum chloride were added when the rate of reaction dropped considerably. A total of 13.5 parts of aluminum chloride was added. An induction period of about 10 minutes was observed, after which reaction temperature rose to 36° C. and remained there until all of the hexafluoroacetone had been absorbed. Decomposition of the reaction mixture with 200 parts of water yielded a solid which was filtered off. The solid was taken up in aqueous sodium hydroxide, decolorized with charcoal and acidified. The product obtained was crystall'zed from alcohol-water twice to give 34 parts (70% yield) of 4,4'-bis(hexafluoro-2-hydroxy-2-propyl)-biphenyl melting at 125.8–126.4° C. The product is represented by the following structural formula:

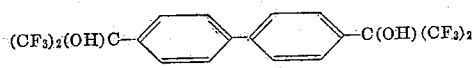

Example 6

A suspension of 46 parts of p-terphenyl in about 1263 parts of carbon disulfide was treated in the presence of 2 parts of aluminum chloride with hexafluoroacetone so that absorption of the hexafluoroacetone was complete. Additional aluminum chloride was introduced as needed when the reaction rate dropped. A total of 88 parts of hexafluoroacetone and 11 parts of aluminum chloride was used. Decomposition of the reaction mixture with 200 parts of water yielded 95 parts (86% yield) of a powder melting at 175° C.

Analysis of the product gave 35.2% fluorine, showing that the product was a mixture of 4-(hexafluoro-2-hydroxy-2-propyl)-p-terphenyl and 4,4''-bis(hexafluoro-2-hydroxy-2-propyl)-p-terphenyl. The structural formulae for these compounds are given below:

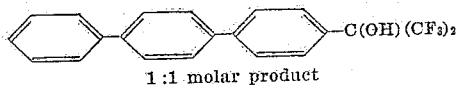

1:1 molar product

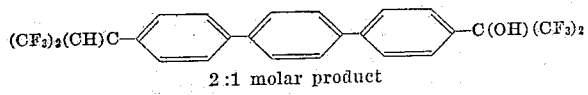

2:1 molar product

Example 7

200 parts of dodecylbenzene and 2 parts of aluminum chloride were treated with 83 parts of hexafluoroacetone. The reaction mixture was decomposed and fractionated. 116 parts (56% yield) of 4-(hexafluoro-2-hydroxy-2-propyl)-dodecylbenzene boiling at 128–130° C. at 2 mm. Hg were obtained. The product is represented by the following structural formula:

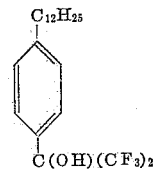

Fluorine analysis of the product was 27.7% and hydrogen analysis was 7.58%, as compared to the theoretical values of 27.7% and 7.52%, respectively.

Example 8

A mixture of 34 parts of diphenylether and 80 parts of sym-tetrafluorodichloroacetone was stirred and admixed with aluminum chloride in small portions so that the reaction temperature did not exceed 60° C. A total of 53 parts of aluminum chloride was added. The reaction mixture was stirred 1 hour, poured on ice and the resultant organic layer washed with water, dried and fractionated. 46.2 parts (62% yield) of 4,4'-bis(1,1,3-tetrafluoro - 1,3 - dichloro-2-hydroxy-2-propyl)-diphenylether boiling mostly at 200–202° C. at 2 mm. Hg were obtained.

The product is represented by the following structural formula:

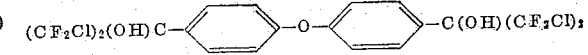

Fluorine analysis of the product was 25.7% and hydrogen analysis was 1.84%. Theoretical values for the fluorine and hydrogen are 26.8% and 1.76%, respectively.

As indicated above, the fluorinated ketone derivatives of this invention find valuable application as active insecticidal and miticidal toxicants. The compounds can be employed either as sole toxicant ingredients or they can be emlpoyed in conjunction with other pesticidally active materials such as DDT, benzene hexachloride, etc.

The compounds are ordinarily applied as toxicants for combatting insect and mite pests in conjunction with a carrier which may be an inert solid, liquid or gaseous material, or a bait.

When employed in the form of a powder, fine or granular dust for killing insects and mites, the toxicant may be mixed with a substantial proportion of any sutiable inert material or diluent such as known grades of prepared parasiticide carrier clays, pyrophyllite, fuller's earth, bentonite, sulfur, lime, talc, whiting, diatomaceous earth, etc. Suitable dusts of this type usually contain not less than 0.5%, and preferably not less than 1% of toxicant.

Liquid insecticide or miticide sprays containing the toxicant may be prepared by first forming a solution of the compound in a suitable organic solvent, e.g., xylene, toluene or benzene, and preferably adding a small amount of emulsifying agent commonly employed in the art, such as diglycol oleate or p-isooctyl phenyl ether of polyethylene glycol. The resulting concentrate solution is incorporated with water in amounts sufficient to form an aqueous spray dispersion or emulsion having the desired active ingredient concentration. In a preferred embodiment, aqueous spray dispersions or suspensions may be formed by incorporating in water so-called dry wettable spray powders or water-dispersible pastes containing the fluorinated ketone derivatives. These mixtures may also include inert diluents, suitable quantities of wetting, dispersing and suspending agents and, if desired, secondary toxicants.

The aqueous spray dispersions of this invention should preferably contain the toxicant in amount not less than ⅛ pound per 100 gallons of spray, the more usual amount being in the range of ½ to 2 pounds per 100 gallons of spray.

Bait preparations of the invention should contain the toxicant in association with a substance attractive to the pest, such as a food or breeding material. Usually, ½ to 1% by weight of the toxicant would be used in the bait.

The following table shows the results of tests on application of the fluorinated ketone derivatives to insects and mites. The tests were carried out using 2 pounds of toxicant per 100 gallons of 50:50 acetone-water.

| Compound | Mexican Bean Beetle Larvae, Percent Kill | Pea Aphids, Percent Kill | Southern Armyworm Larvae, Percent Kill | Two-Spotted Mites, Percent Kill |
|---|---|---|---|---|
| 4-(hexafluoro-2-hydroxy-2-propyl)-diphenylmethane | | 100 | 100 | |
| A mixture of 4-(hexafluoro-2-hydroxy-2-propyl)-diphenylether and 4,4'-bis(hexafluoro-2-hydroxy-2-propyl)-diphenylether | 100 | 100 | 80 | 56.2 |
| 4,4'-bis(hexafluoro-2-hydroxy-2-propyl)-diphenylether | | 90 | | 100 |
| 4,4'-bis(hexafluoro-2-hydroxy-2-propyl)-diphenylsulfide | 80 | 100 | | 89.5 |
| 4,4'-bis(hexafluoro-2-hydroxy-2-propyl)-biphenyl | | | 60 | 96.4 |
| A mixture of 4-(hexafluoro-2-hydroxy-2-propyl)-p-terphenyl and 4-4''-bis(hexafluoro-2-hydroxy-2-propyl)-p-terphenyl | 80 | | 100 | |
| 4-(hexafluoro-2-hydroxy-2-propyl)-dodecylbenzene | | 90 | | |
| 4,4'-bis(1,1,3,3-tetrafluoro-1,3-dichloro-2-hydroxy-2-propyl)-diphenylether | 100 | 90 | 100 | 66.7 |

The following results were obtained in tests on houseflies using 1.0% of the toxicant in dry food (sugar):

| Compound | Houseflies, Percent Kill | |
|---|---|---|
| | 7 Days | 9 Days |
| 4-(hexafluoro-2-hydroxy-2-propyl)-diphenylmethane | 93.8 | 100 |
| 4,4'-bis(1,1,3,3-tetrafluoro-1,3-dichloro-2-hydroxy-2-propyl)-diphenylether | 97.9 | 100 |

The tests on toxicity to mites were carried out on two-spotted mites (*Tetranychus telarius*) by spraying the formulation onto horticultural (cranberry) bean plants infested with the mites. Following treatment, the plants were stored on racks in irrigated trays under greenhouse conditions. Mortality counts were made three days after treatment.

The tests on toxicity to pea aphids (*Macrosiphum pisi*) were run by removing the pea aphids from infested broad bean plants, placing them on a wire screen and spraying them with the formulation. Following treatment, the pea aphids were confined to untreated broad bean plants. Record of kill was made three days after treatment.

The tests on toxicity to Mexican bean beetle larvae (*Epilachna varivestis*) and to southern armyworm larvae (*Prodenia eridania*) were run by spraying horticultural (cranberry) bean plants with the formulation and allowing the plants to dry. The larvae were confined to the treated foliage by means of wire cages. Record of kill was made three days after treatment.

The tests on toxicity to houseflies (*Musca domestica*) were run by treating dry food (sugar) with the toxicant, allowing the food to dry and then repulverizing the food. The treated food was placed in emergence cages containing pupae, and percent kill was noted seven and nine days after treatment.

While we have described the preferred embodiments for carrying out our invention, it will be apparent that many changes may be made without departing from the spirit of the invention.

We claim:

4.4' - bis(1,1,3,3 - tetrafluoro-1,3-dichloro-2-hydroxy-2-propyl)-diphenylether.

References Cited
UNITED STATES PATENTS
3,236,894  2/1966  England _____ 260—574

BERNARD HELFIN, *Primary Examiner.*

CHARLES B. PARKER, L. ZITVER, *Examiners.*

D. R. PHILLIPS, *Assistant Examiner.*